United States Patent [19]
Sullivan

[11] Patent Number: 6,158,943
[45] Date of Patent: Dec. 12, 2000

[54] PUSHBACK STORAGE SYSTEM

[76] Inventor: Chad D. Sullivan, 2700 Chamber St., Stevens Point, Wis. 54481

[21] Appl. No.: 09/340,826

[22] Filed: Jun. 28, 1999

[51] Int. Cl.[7] ..................................................... A47F 5/00
[52] U.S. Cl. ........................... 414/286; 211/151; 414/276
[58] Field of Search ............................. 211/151; 414/276, 414/286

[56] References Cited

U.S. PATENT DOCUMENTS

| | | |
|---|---|---|
| 3,038,613 | 6/1962 | Sylvester et al. . |
| 3,757,967 | 9/1973 | Colbridge . |
| 4,197,047 | 4/1980 | Haldimann . |
| 4,341,313 | 7/1982 | Doring . |
| 4,349,114 | 9/1982 | Vickers et al. . |
| 4,613,270 | 9/1986 | Konstant et al. . |
| 4,687,404 | 8/1987 | Seiz et al. . |
| 4,915,240 | 4/1990 | Konstant . |
| 5,080,241 | 1/1992 | Konstant .................................. 211/511 |
| 5,117,990 | 6/1992 | Krummell et al. . |
| 5,137,159 | 8/1992 | Collins et al. . |
| 5,141,118 | 8/1992 | Gay . |
| 5,180,069 | 1/1993 | Krummell et al. . |
| 5,328,038 | 7/1994 | Allen ...................................... 211/511 |
| 5,393,188 | 2/1995 | Scott et al. . |
| 5,419,444 | 5/1995 | Strom . |

*Primary Examiner*—Steven A. Bratlie
*Attorney, Agent, or Firm*—Burd, Bartz & Gutenkauf

[57] ABSTRACT

A pushback storage system has a pair of step box rails providing upper and lower tracks for wheels of carts for accommodating pallets used to carry loads. The carts has side members secured to opposite side edges of a deck having panels that connect the area between the side members. Wheels mounted on opposite ends of the side members of two carts ride on the lower tracks. Brackets connect wheels to two additional carts which wheels ride on the upper tracks to allow the carts to be located in vertical stacked relationship.

36 Claims, 13 Drawing Sheets

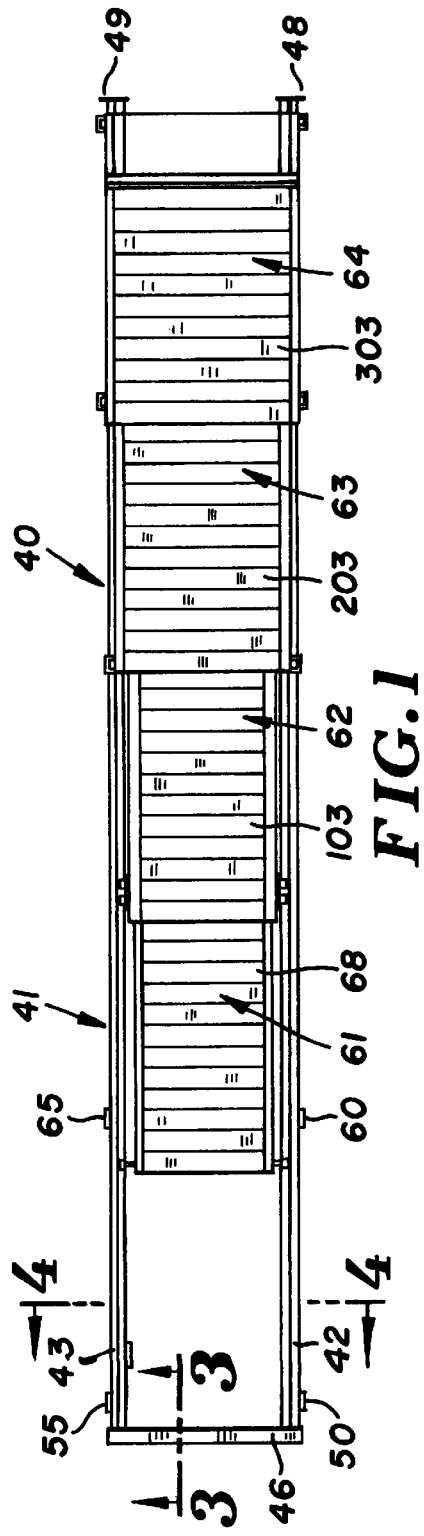
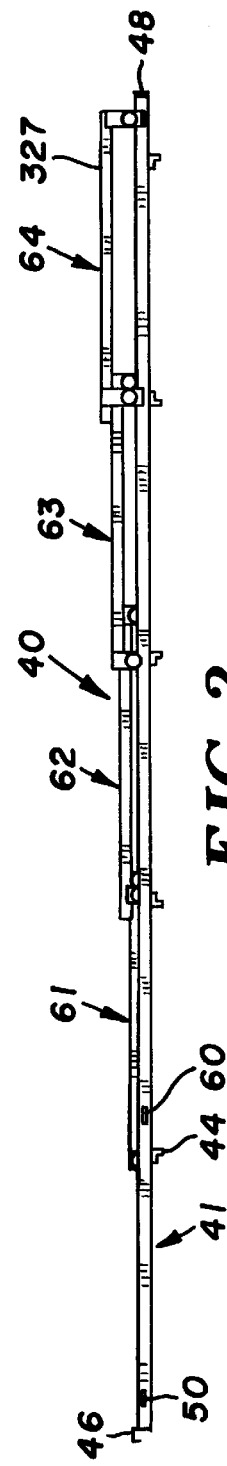
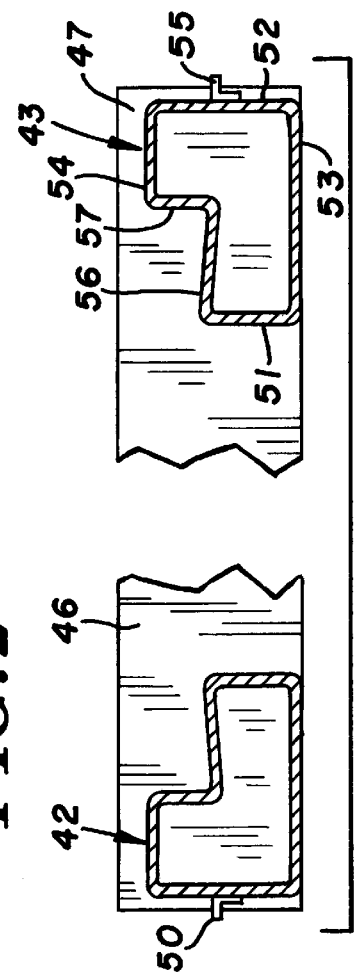
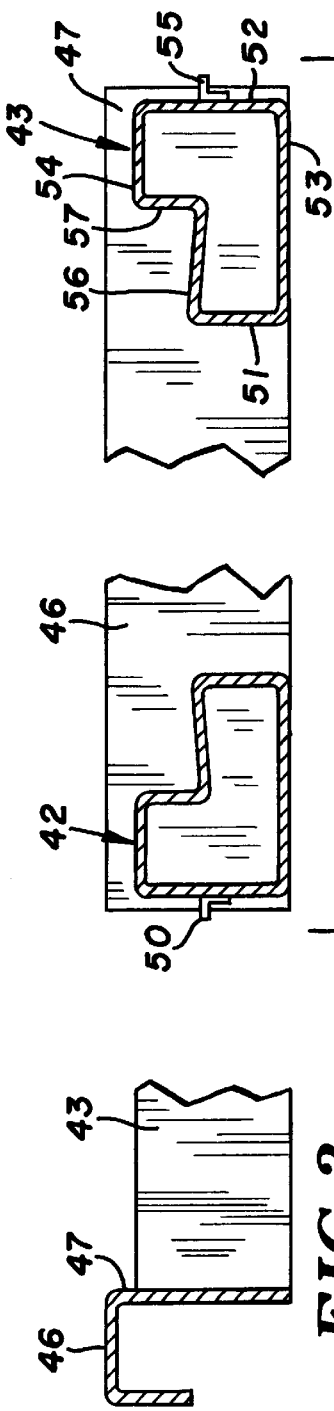

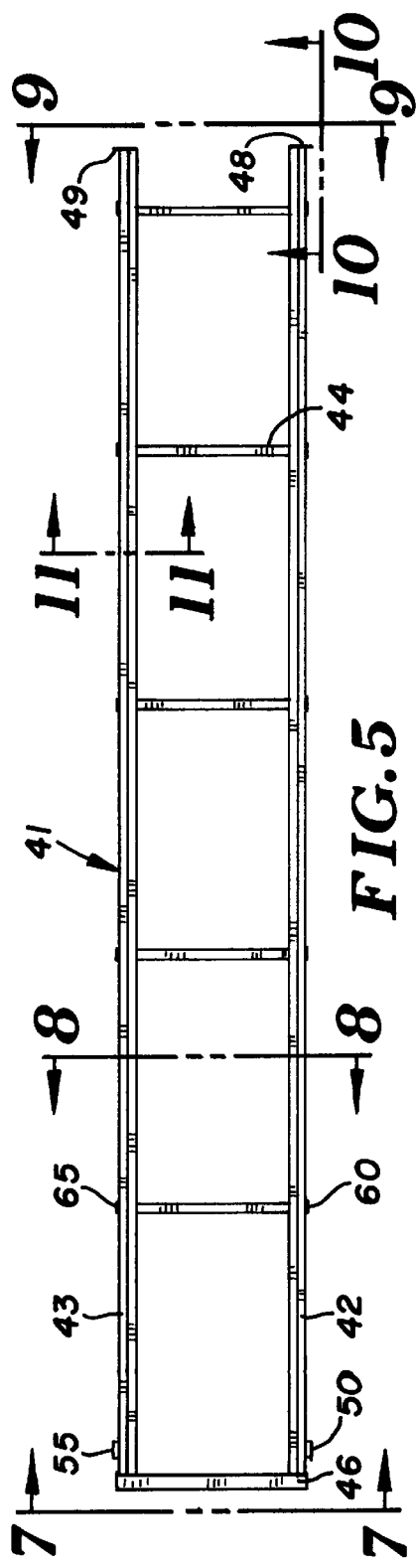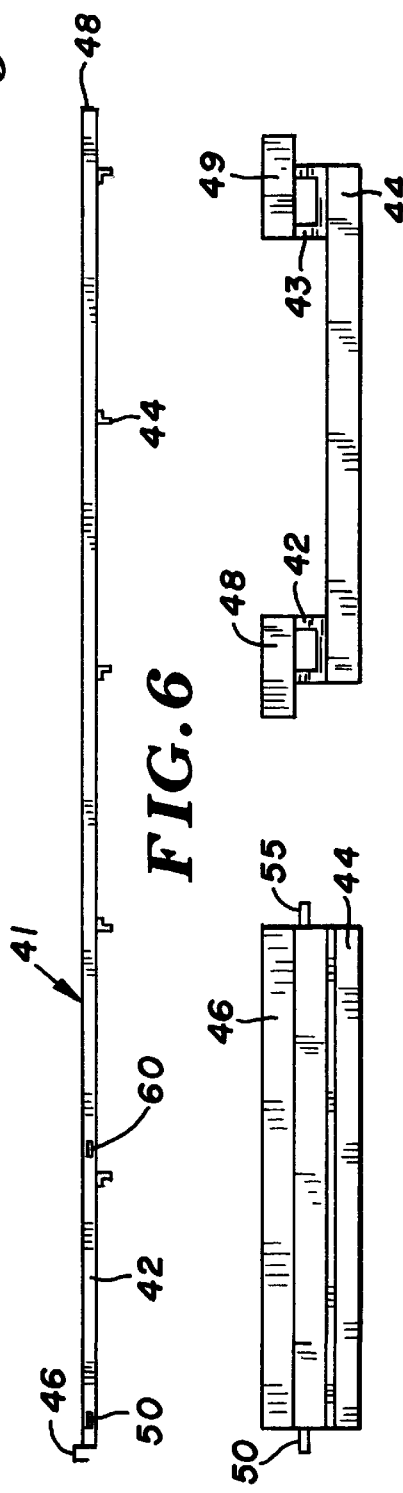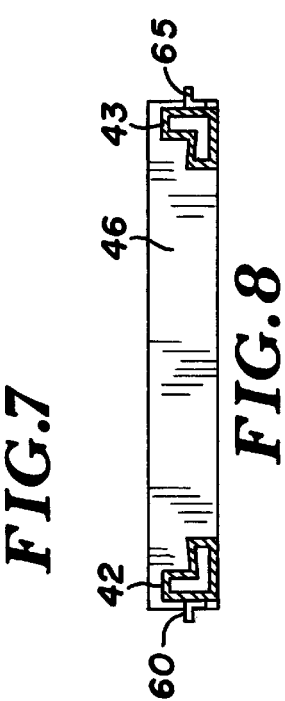

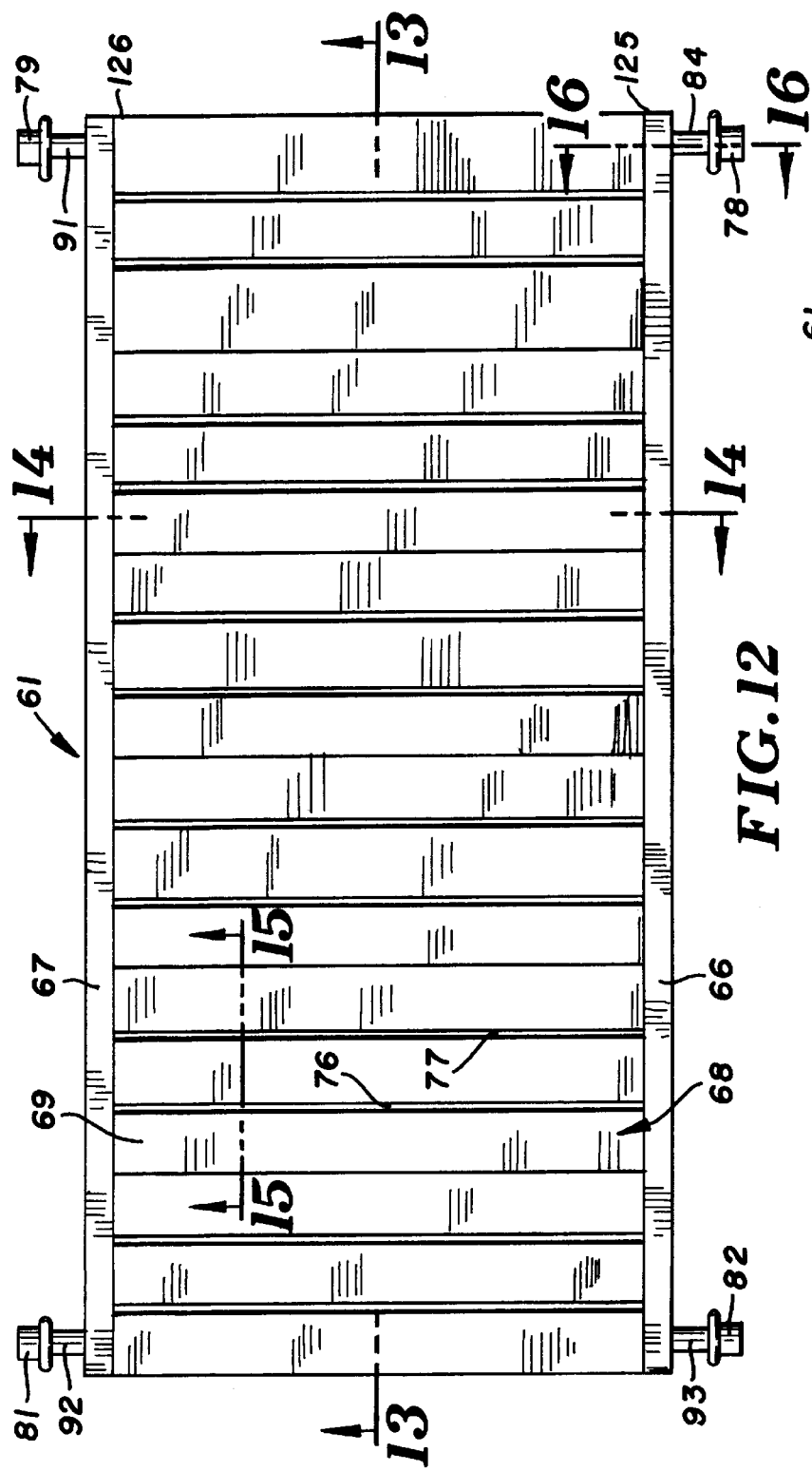
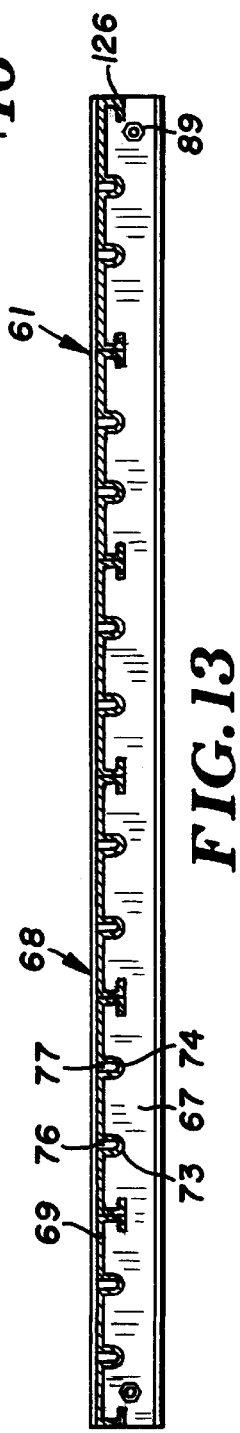
FIG.12
FIG.13

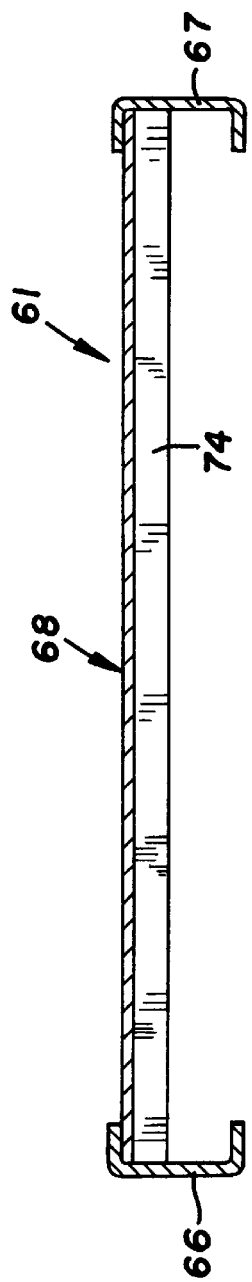
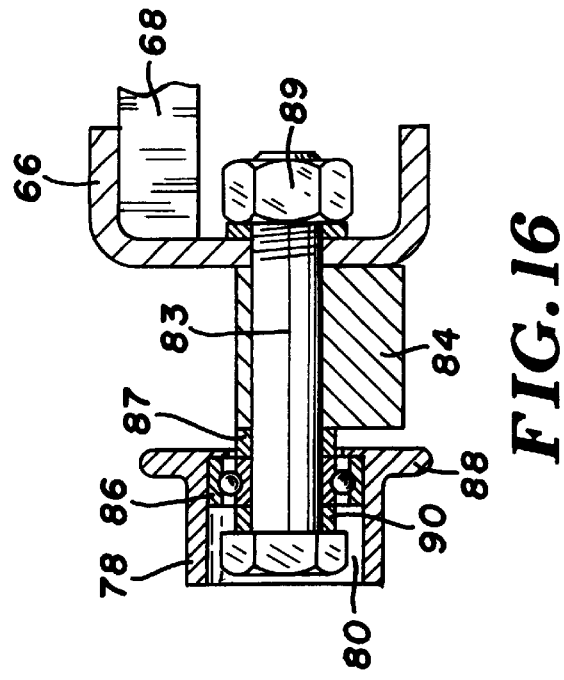
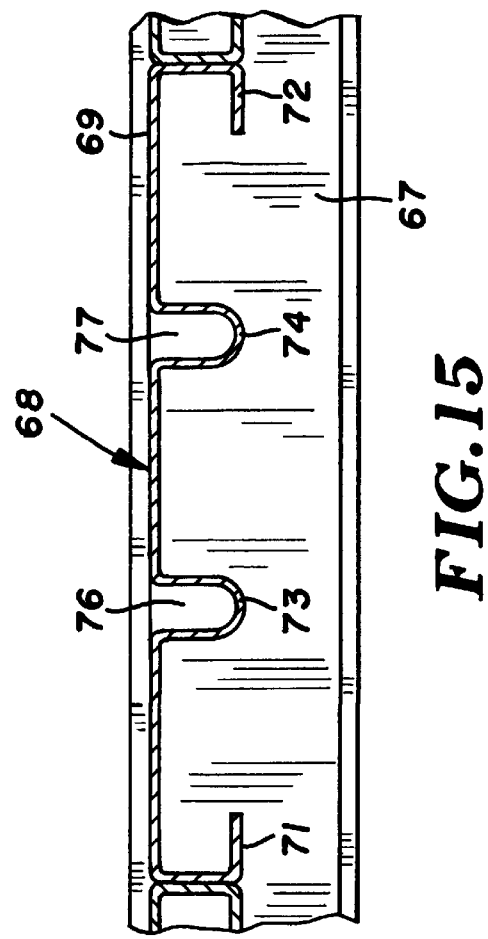
FIG. 14
FIG. 15
FIG. 16

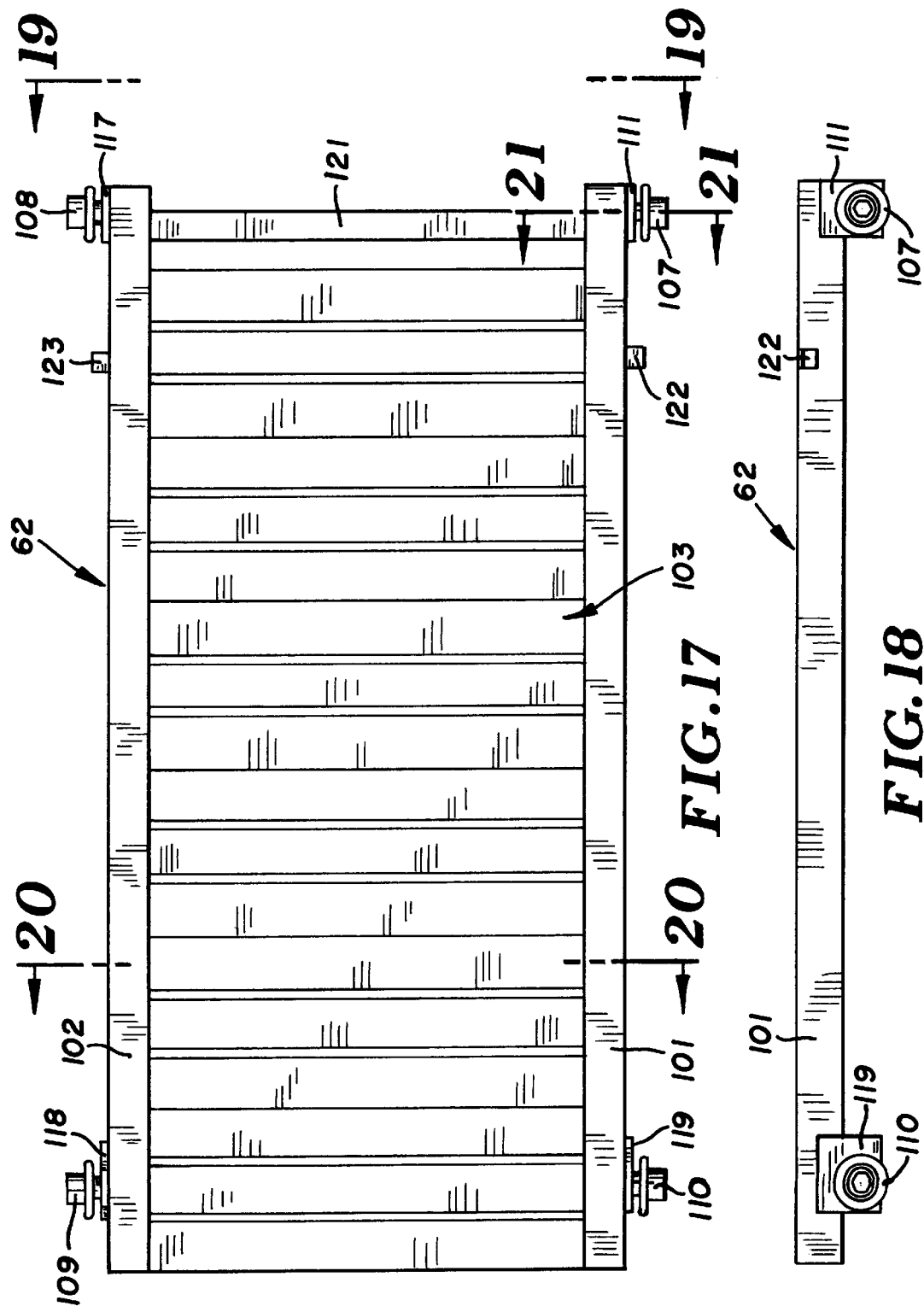

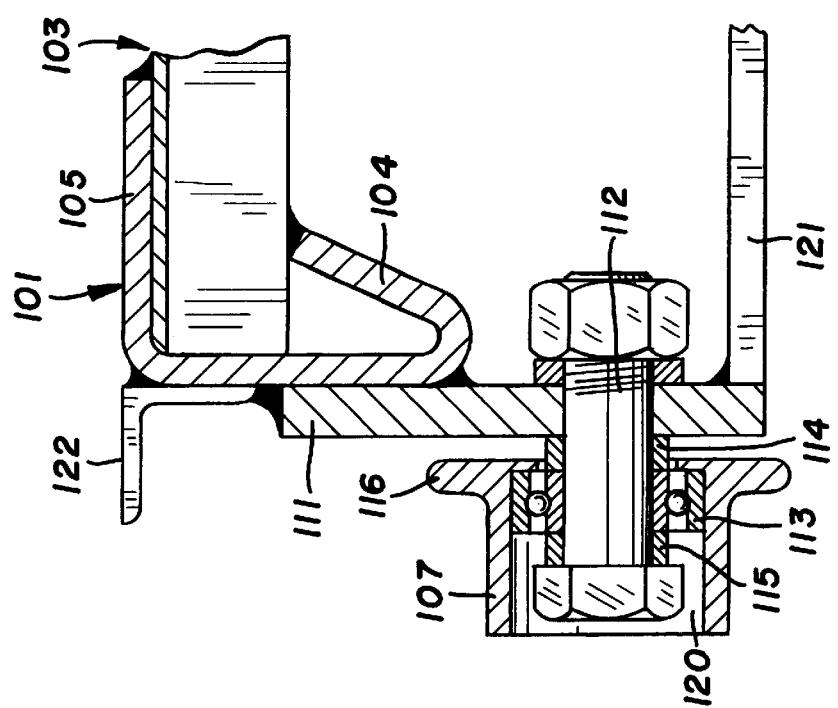
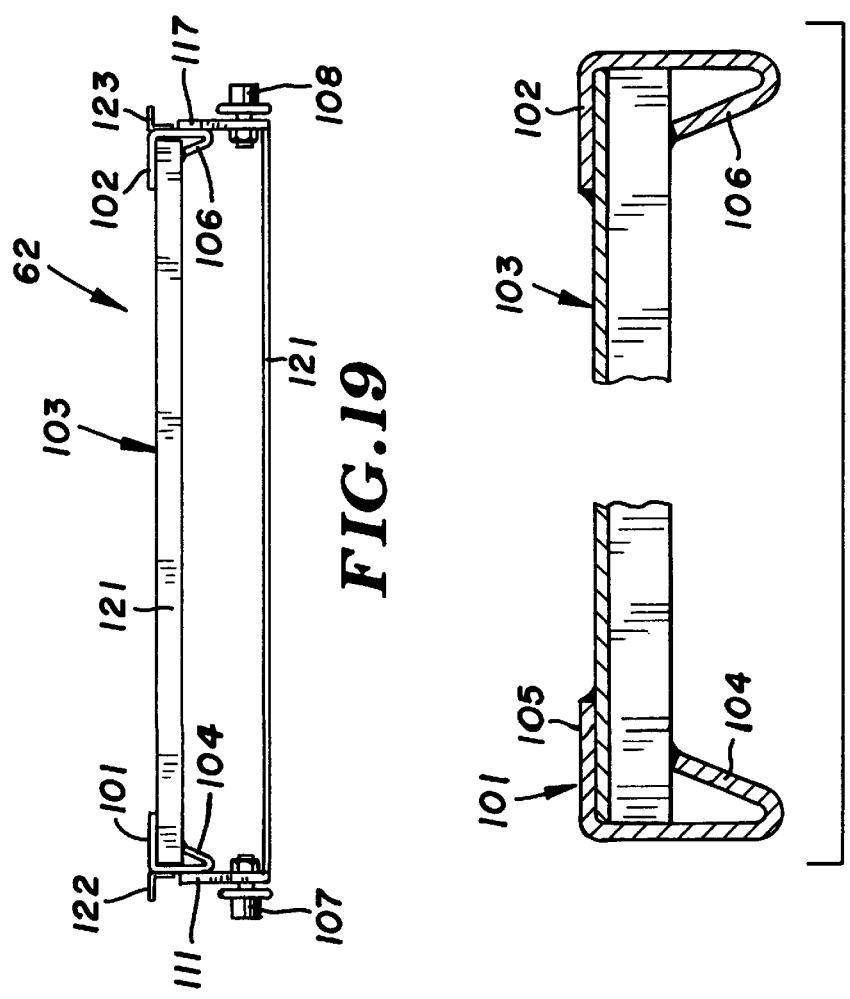

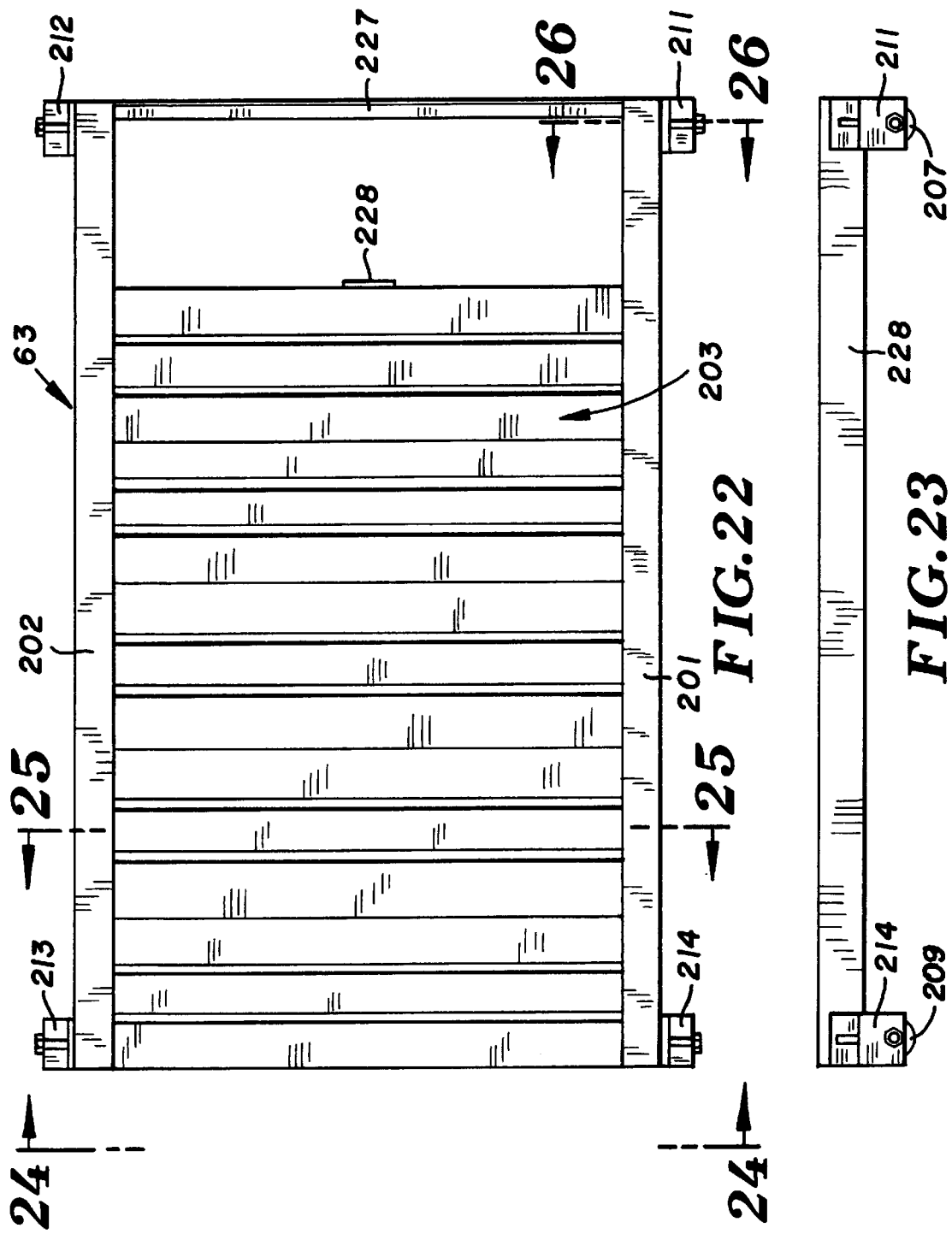

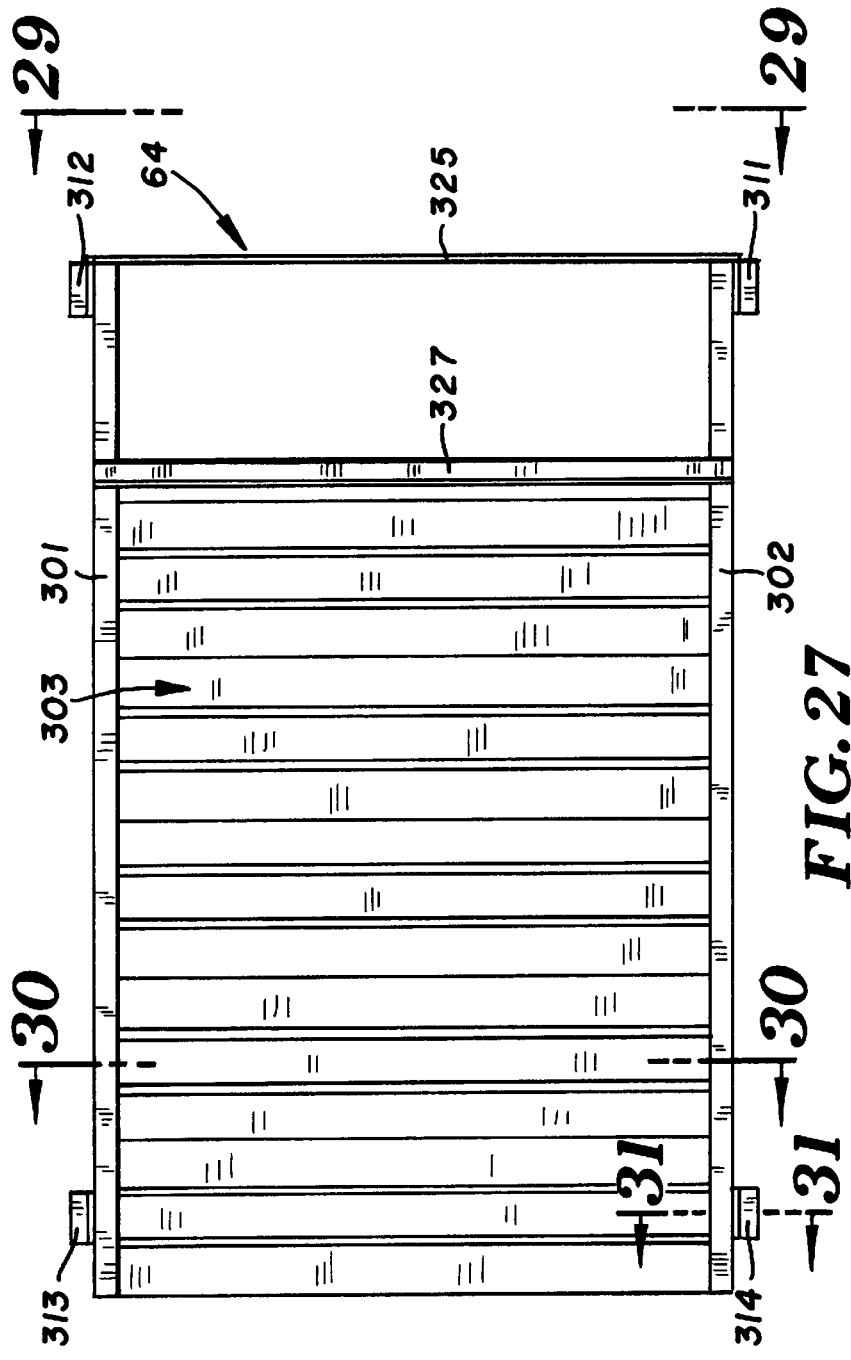
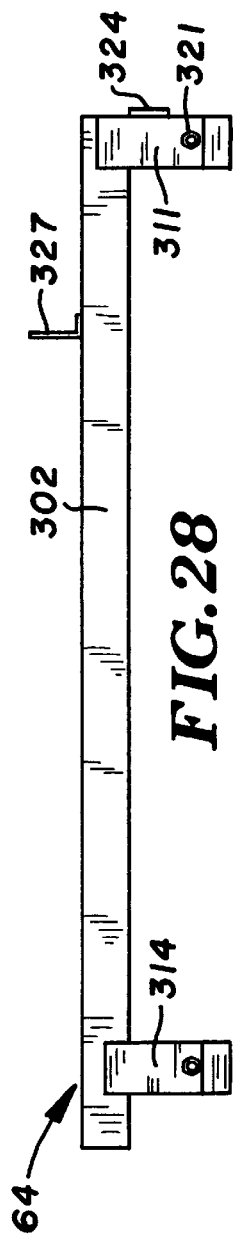
FIG. 27
FIG. 28

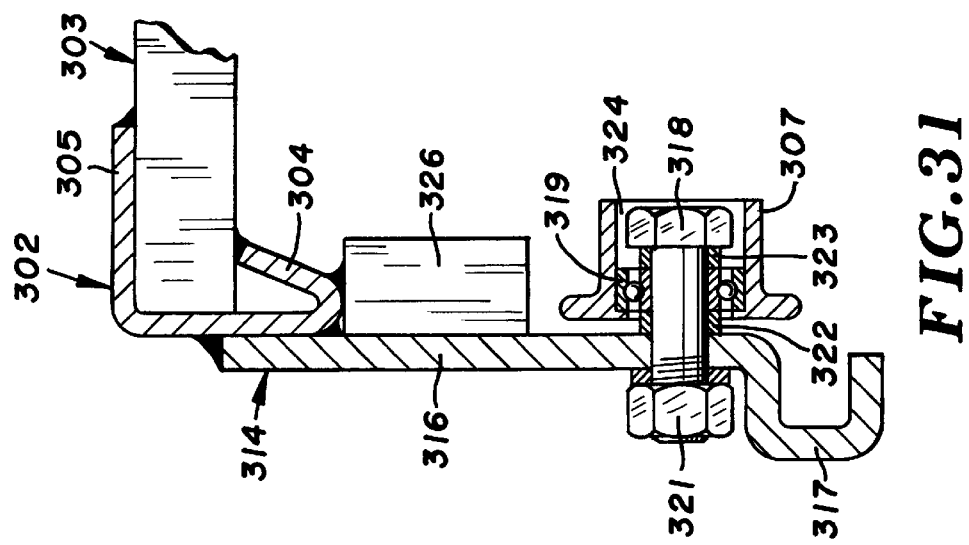
FIG.31
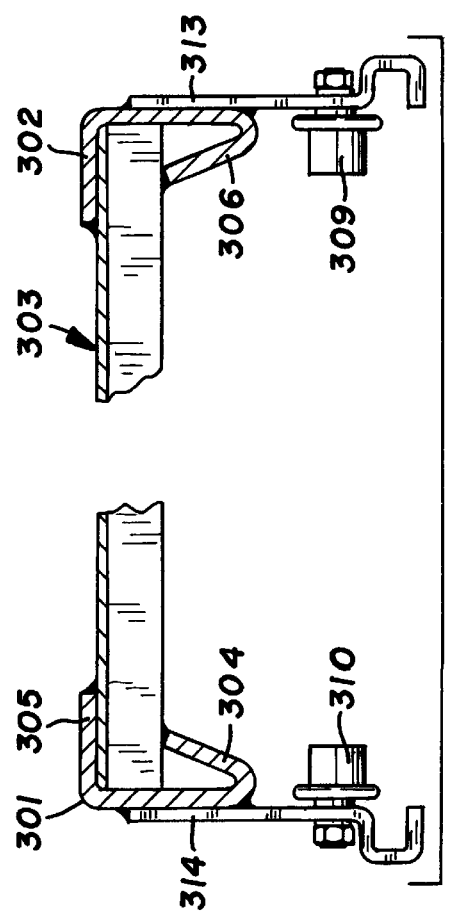
FIG.29
FIG.30

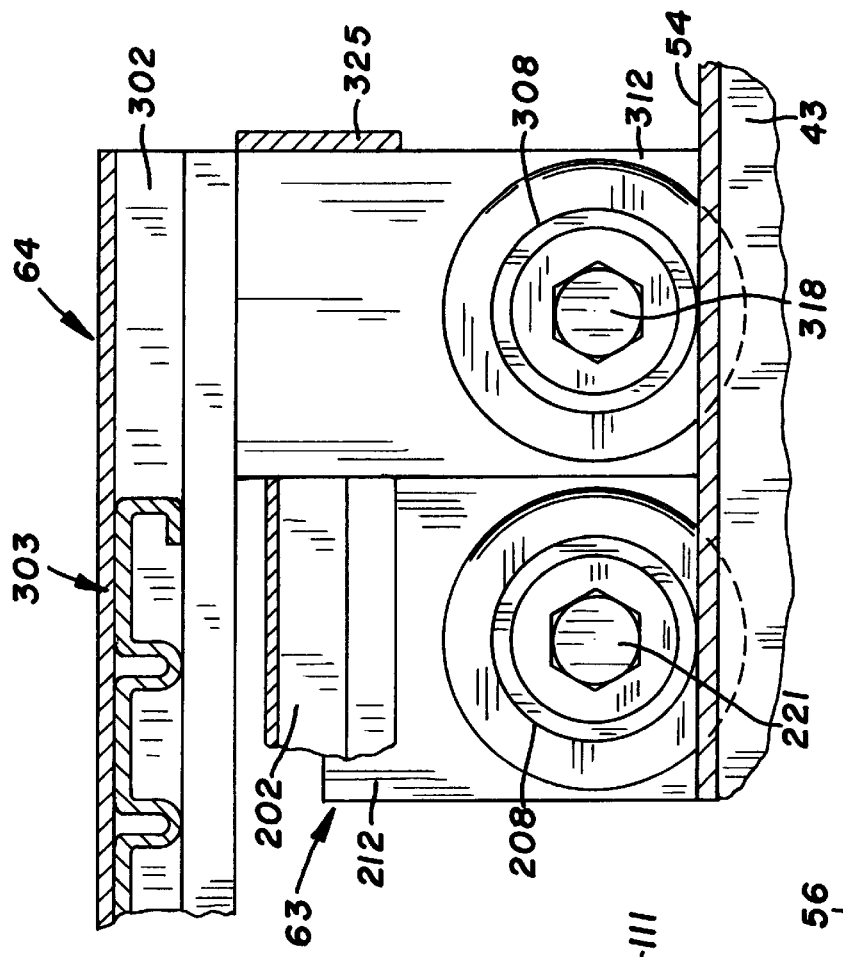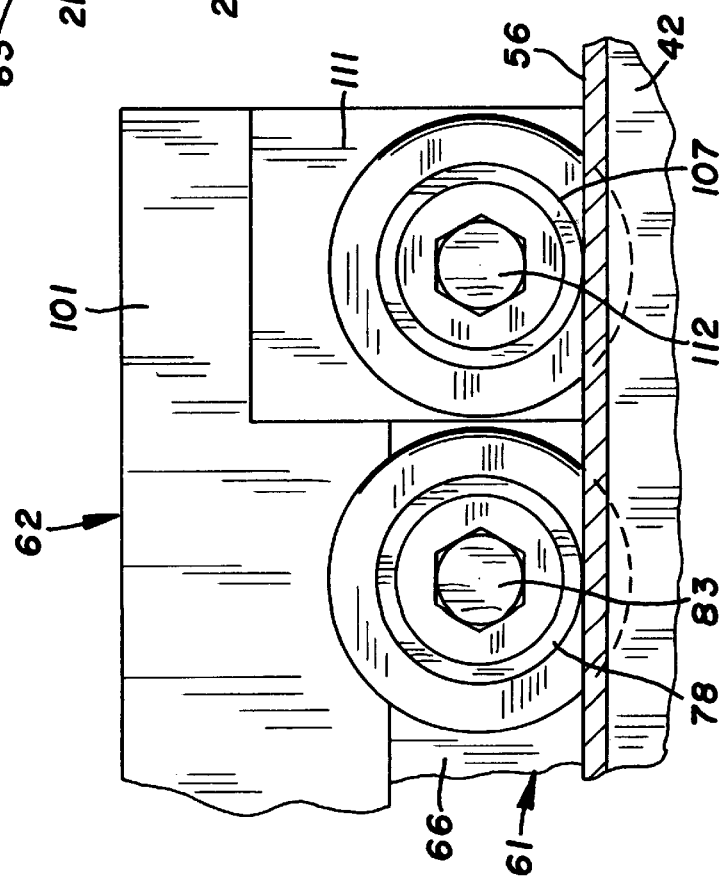

PUSHBACK STORAGE SYSTEM

FIELD OF THE INVENTION

The present invention relates to improvements in warehouse product storage systems having a number of carts movably supported on a rail assembly. The rail assembly has linear rails providing tracks for wheels supporting the carts on the rails. The carts carry pallet loaded with containers, cartons, or products.

BACKGROUND OF THE INVENTION

Product inventories are warehoused where they can be quickly and efficiently stored and retrieved to accommodate marketing and consumer demands. Warehouse storage rack structures having a plurality of rows of vertically stacked bays are used to store pallets supporting containers, cartons, or products. Each bay has rail assemblies providing parallel tracks for the wheels of carts carrying the pallets. Examples of warehouse storage rack structures having movable carts for carrying pallets are described in the following U.S. Patents.

E. Doring in U.S. Pat. No. 4,341,313 discloses a pallet shelving structure having inclined rails accommodating carriages for supporting pallets. The pallets are loaded and unloaded from the carriages at one end of the rails to reduce the passageway area required for using the shelving structure.

T. Scott et al in U.S. Pat. No. 5,393,188 discloses a pallet storage system having rectangular rails and U-shaped carts. The rails have top surfaces for cart wheels which ride on inner and outer top edges of the rails. The carts are sized so that carts overlap each other when located in the loading positions of the carts.

SUMMARY OF THE INVENTION

The invention is a pushback cart storage apparatus for pallets used to carry loads, such as cartons, containers, and products. The apparatus has a track assembly and carts movably associated with the track assembly that can be installed on and is compatible with conventional racks used in warehouses for storing pallets carrying loads. The carts have relatively low profiles which increase vertical pallet space and provide extra lift clearance during loading and unloading of pallets from the carts. The increased vertical pallet space increases warehouse product storage capacity. The carts have longitudinal side members secured to a horizontal deck which can accommodate a variety of pallet weights and sizes including pallets carrying heavy loads. The decks and side members of the carts have stability due to vertical, horizontal and torsional strength of these combined structures. The carts have wheels that ride on upper and lower tracks of the rails of the track assembly to allow the carts to be located in generally vertical stacked locations and movable to generally end-to-end positions when loaded with pallets. The rails comprise step box beams that have parallel upper and lower top tracks. One or more carts movably supported on the lower tracks interengage one or more carts that ride on the upper tracks to permit vertical stacking of the carts and control relative movement of the carts along the tracks.

The preferred embodiment of the apparatus for storing pallets used to carry loads has a track assembly mounted on a rack structure used in a warehouse to store products. The track assembly has a pair of parallel linear rails. Each rail is a step box beam having upper and lower tracks providing continuous longitudinal surfaces for the wheels of carts for supporting pallets carrying loads. Each rail has first and second side walls joined to a bottom wall, an upright middle wall located between the upright side walls, and upper and lower top walls having the upper and lower tracks. The upper top wall is joined to the first side wall and the top of the middle wall. The lower top wall is joined to the second side wall and the bottom of the middle wall to locate the lower track below the horizontal plane of the upper top wall. The lower top wall slopes or inclines downwardly and inwardly from the second side wall to the middle wall to enhance the linear tracking of the wheels riding on the lower tracks of the rails. Each of the carts have a pair of parallel and laterally spaced side members and a deck extended between and secured to the side members. The deck covers substantially the entire area between the side members. The deck has a plurality of side-by-side transverse panels having transverse side flanges and downwardly extended transverse ribs. Opposite ends of the panels are secured with welds to the side members. An alternative deck can be a sheet metal panel having transverse reinforcing ribs or corrugations. The cart side members are channel members having upper flanges and lower upwardly directed flanges that contact and are secured to side portions of the deck. The side portions of the deck are located between the upper and lower flanges of the side members to firmly secure the deck to the side members. The lower flange also provides support for the deck.

Wheels rotatably mounted on axles connected to opposite ends of the side members position the carts on the rails. Brackets secured to the second and subsequent carts accommodate the axles. The vertical lengths of the brackets vary to allow the carts to be located in a vertical stacked location at the loading and unloading end of the track assembly.

The advantages and objects of the pushback cart storage apparatus of the invention are embodied in the following detailed description taken in connection with the drawing

DESCRIPTION OF THE DRAWINGS

FIG. 1 is a top plan view of a pushback storage system having the multiple cart and track assembly of the invention;

FIG. 2 is a side elevational view of FIG. 1;

FIG. 3 is an enlarged sectional view taken along line 3—3 of FIG. 1;

FIG. 4 is a foreshortened enlarged sectional view, taken along line 4—4 of FIG. 1;

FIG. 5 is a top plan view of the track assembly of FIG. 1;

FIG. 6 is a side elevational view of the track assembly of FIG. 4;

FIG. 7 is an enlarged end elevational view of the loading end of the track assembly of FIG. 5;

FIG. 8 is an enlarged sectional view taken along line 8—8 of FIG. 5;

FIG. 9 is an enlarged end elevational view of the distal or rear end of the track assembly of FIG. 5 viewing along the line 9—9 of FIG. 5;

FIG. 10 is an enlarged side elevational view of the distal end of the track assembly of FIG. 5 viewing along the line 10—10 of FIG. 5;

FIG. 12 is a top plan view of the first cart of the pushback storage apparatus;

FIG. 13 is a sectional view taken along line 13—13 of FIG. 12;

FIG. 14 is an enlarged sectional view taken along the line 14—14 of FIG. 12;

FIG. 15 is an enlarged sectional view taken along the line 15—15 of FIG. 12;

FIG. 16 is an enlarged sectional view taken along the line 16—16 of FIG. 12;

FIG. 17 is a top plan view of the second cart of the pushback storage apparatus;

FIG. 18 is a side elevational view of FIG. 17;

FIG. 19 is an end elevational view of the right end of FIG. 17, viewing along the line 19—19 of FIG. 17;

FIG. 20 is an enlarged foreshortened sectional view taken along line 20—20 of FIG. 17;

FIG. 21 is an enlarged sectional view taken along line 21—21 of FIG. 17;

FIG. 22 is a top plan view of the third cart of the pushback storage apparatus;

FIG. 23 is a side elevational view of FIG. 22;

FIG. 27 is a top plan view of the fourth cart of the pushback storage apparatus;

FIG. 28 is a side elevational view of FIG. 27;

FIG. 29 is an end elevational view of the right end of FIG. 27 viewing along line 29—29 of FIG. 27;

FIG. 30 is an enlarged foreshortened sectional view taken along line 30—30 of FIG. 27;

FIG. 31 is an enlarged sectional view taken along the line 31—31 of FIG. 27;

FIG. 34 is an enlarged sectional view taken along line 34—34 of FIG. 33; and

FIG. 35 is an enlarged sectional view taken along line 35—35 of FIG. 33

DESCRIPTION OF THE INVENTION

Figure 11:
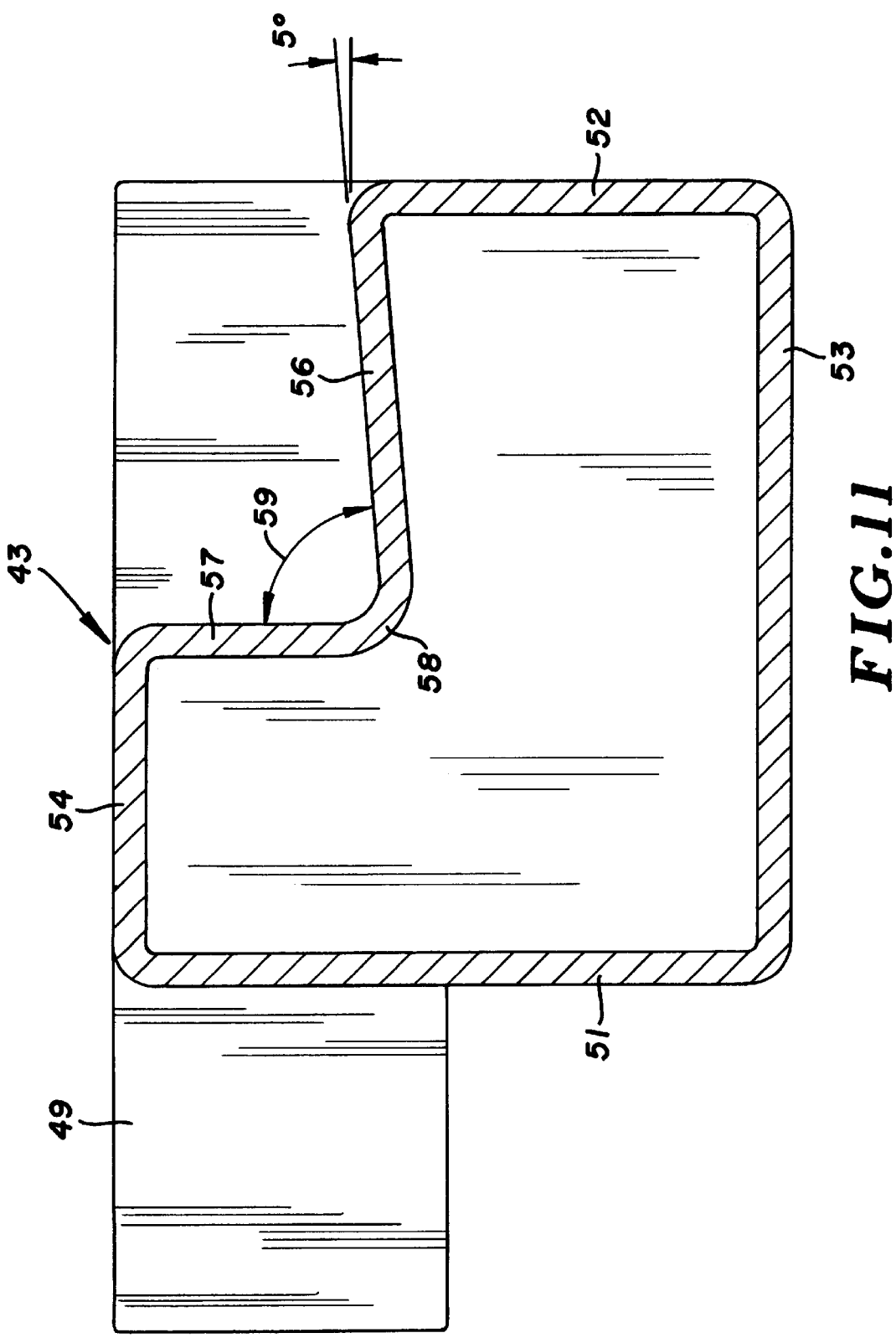
FIG. 11 is an enlarged sectional view taken along line 11—11 of FIG. 5.

Referring to FIGS. 1 and 2, a pushback storage apparatus 40 has a plurality of carts 61, 62, 63 and 64 movably supported on an elongated track assembly 41. Pushback storage apparatus 40 is used in warehouse storage rack structures having vertically stacked bays for accommodating pallets, containers and cartons supporting products, herein defined as loads. Each bay has a number of vertical arranged pushback storage apparatus 40. Each pushback storage apparatus 40 accommodates up to five pallets. The pushback apparatus can accommodate two, three, four or five pallets. A warehouse storage rack structure having pushback carts movably supported on rails is shown in U.S. Pat. No. 5,393,188. As shown in FIGS. 5 and 6, track assembly 41 has a pair of laterally spaced elongated step box rails 42 and 43 secured to transverse supports 44 of the rack structure. Track assembly 41 slopes or inclines downwardly toward the loading and unloading end of apparatus 40. A transverse inverted channel member 46, shown in FIGS. 3, 4, 7 and 8, is secured to the front or proximal ends of rails 42 and 43.

The top back portion 47 of member 46 is a transverse shoulder that extends above the top surfaces of rails 42 and 43 to provide a transverse stop for retaining a pallet on rails 42 and 43 adjacent portion 47 of member 46. Member 46 maintains the lateral spacing between rails 42 and 43 and reduces damage of the front portions of rails 42 and 43 by the pallet loading and unloading equipment, such as a fork lift, and the pallets. The distal or rear ends of rails 42 and 43 are secured to ears 48 and 49 which function as stops for cart 64. Ears 48 and 49 are flat plates that project outwardly from the outsides of rails 42 and 43.

As shown in FIG. 11, rail 43 is a tubular member having a cross section step box configuration comprising upright side walls 51 and 52 joined to a flat bottom wall 53, an upper top wall 54 and a lower top wall 56. Walls 54 and 56 have linear surfaces providing lower and upper tracks. An upright middle wall 57 is joined to walls 54 and 56. A rounded corner 58 joins wall 56 to the lower part of wall 57. The angle 59 between walls 56 and 57 is less than 90 degrees. Wall 56 slopes downwardly in a transverse direction into rail 43. The slope of wall 56 is about 5 degrees relative to the horizontal plane of bottom wall 53. The slope or transverse incline of lower wall 56 can vary. Upper top wall 54 and lower top wall 56 provide elongated linear upper and lower tracks for the wheels of carts 61–64. Two pairs of ears 50, 55 and 60, 65 are secured to the outsides of rails 42 and 43. The ears 50, 55, 60 and 65 cooperate with brackets 311, 312, 313 and 314 of cart 64 when cart 64 is in the stacked position to prevent lifting and separation of cart 64 from track assembly 41. The fork lift used to unload a pallet from cart 64 may inadvertently engage cart 64 and attempt to lift cart 64 off of track assembly 41. Ears 50, 55, 60, and 65 retain cart 64 on track assembly 41 as the lower ends of brackets 311–314 hook under ears 50, 55, 60, and 65 when cart 64 is lifted.

The first cart 61, shown in FIGS. 12 to 16, has a pair of elongated side channel members for beams 66 and 67 secured to opposite side edges of a deck 68. Deck 68 is a continuous platform that can extend the full length of members 66 and 67 and covers the space between members 66 and 67 so as to provide cart 61 with a low profile. Deck 68 does not extend above or below side members 66 and 67. Deck 68 comprises a plurality of side-by-side panels 69 having ends secured with welds to channel members 66 and 67. The deck can be a sheet metal panel having transverse ribs, corrugations, or other reinforcing structures. As shown in FIG. 15, each panel 69 has downwardly directed right angle side flanges 71 and 72 and can have transverse U-shaped ribs 73 and 74. Ribs 73 and 74 project downward providing the top of panel 69 with a pair of transverse grooves 76 and 77. The flanges 71 and 72 and ribs 73 and 74 reinforce the panel and provide deck 68 with a strong low profile. An alternative deck can be a plurality of side-by-side sheet metal panels having flat top walls and side flanges 71 and 72.

Cart 61 is movably supported on lower top walls 56 of rails 42 and 43 with wheels 78, 79, 81 and 82. As shown in FIG. 16, wheel 78 is mounted on a bolt or axle 83 connected to channel member 66. Bolt 83 extends through a block or spacer 84 to locate wheel 78 laterally away from channel member 66. A bearing 86 mounted on bolt 83 accommodates wheel 78. Bearing 86 located in a cavity 80 in wheel 78 is spaced from block 84 with a first sleeve 87. The sleeve 87 spaces rim 88 of wheel 78 from block 84. A nut 89 threaded on the inner end of bolt 88 retains bolt 83, block 84 and wheel 78 in assembled relation on channel member 66. Second sleeve 90 spaces the head of bolt 83 from bearing 86.

A second sleeve 90 spaces the head of bolt 83 from bearing 86. Bolt 83 clamps bearing 86 between sleeves 87 and 90.

Wheels 79, 81 and 82 are connected to ends of members 66 and 67 with bolt, block, and bearing structures that are the same as shown in FIG. 16. Blocks 91, 92, and 93 space wheels 79, 81 and 82 from adjacent channel members.

Figure 32:
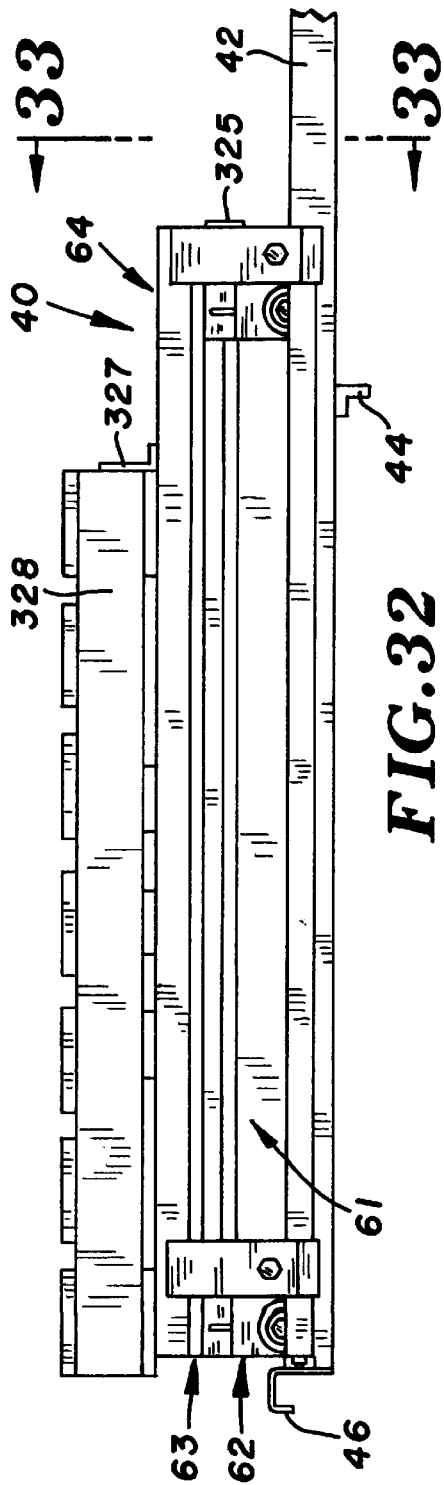
FIG. 32 is a side elevational view of the loading and unloading end of the pushback storage system showing the stacked positions of the carts.
Figure 33:
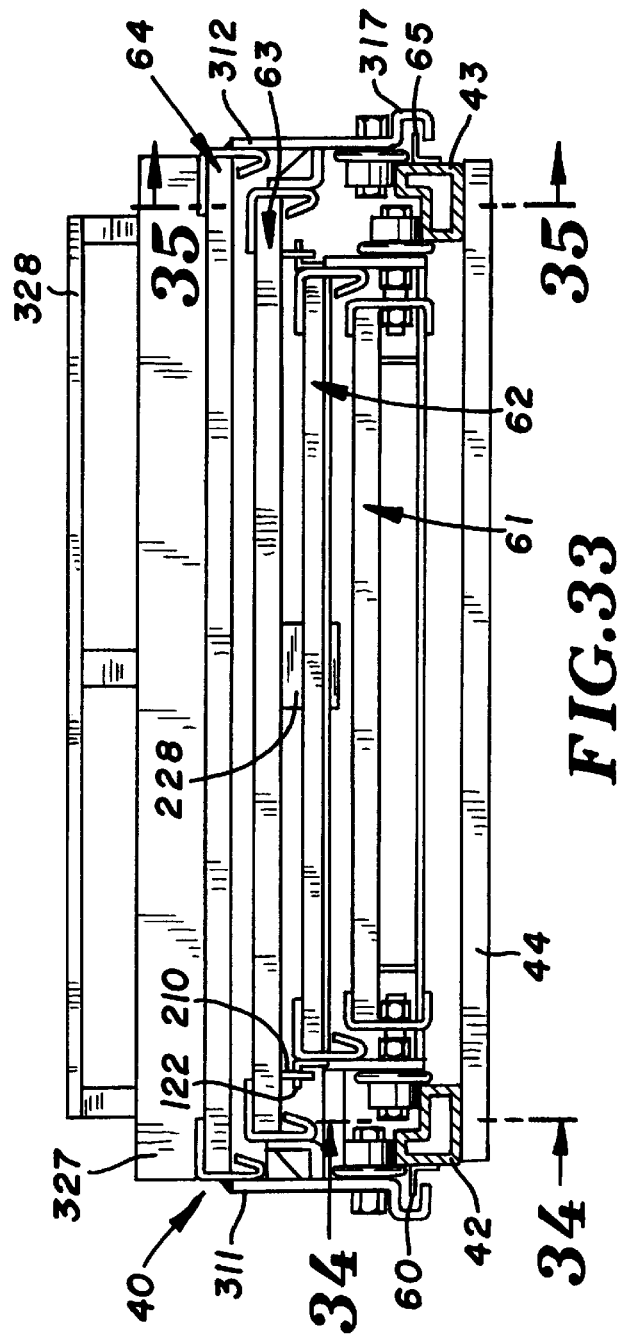
FIG. 33 is a sectional view taken along line 33—33 of FIG. 32.

The second cart 62, shown in FIGS. 17–21, has a pair of elongated side members or beams 101 and 102 secured to opposite sides of deck 103. Deck 103 comprises a plurality of side-by-side transverse panels which could cover substantially all the space between members 101 and 102. The width of cart 62 is greater than the width of cart 61 to allow cart 62 to be located over cart 61 when the carts are in stacked or nested relationship, as shown in FIGS. 32 and 33. Each panel of deck 103 has the same structure as panel 69 shown in FIG. 15.

As shown in FIGS. 20 and 21, rail 101 has a generally horizontal top flange 105 and an upwardly and inwardly directed bottom flange 104. Deck 103 has a side edge located between flanges 104 and 105. The top of deck 103 is secured with welds to flange 105. The ribs, corrugations or reinforcing structures of deck 103 are secured to flange 104 with welds. The opposite side edge of deck 103 is secured to the flanges of side member 102. The bottom flanges 104 of members 101 and 102 support loads carried by deck 103.

Cart 62 is movably supported on lower top walls 56 of rails 42 and 43 with wheels 107, 108, 109 and 110. Wheels 107 and 110 are operatively mounted on brackets or plates 111 and 119 secured to opposite ends of side member 101. Plates 117 and 118 on opposite ends of side member 102 support wheels 108 and 109. As shown in FIG. 21, wheel 107 is rotatably mounted on a bolt 112 with a bearing 113. Bolt 112 extends through a hole in plate 111 and into a cavity 120 in wheel 107. A first sleeve 114 spaces the inside flange 116 from plate 111. A second sleeve 115 spaces the head of bolt 112 from bearing 113. Bolt 112 clamps bearing 113 between sleeves 114 and 115 and fixes the lateral position of wheel 107 relative to plate 111. Wheels 108, 109, and 110 are mounted on plates 117, 118, and 119 with bolts and bearings that have the same structures as bolt 112 and bearing 113. Plates 111, 117, 118 and 119 elevate side members 101 and 102 and deck 103 above cart 61.

A transverse bar or stop member 121 is secured to lower portions of plates 111 and 117. As shown in FIG. 19, bar 121 is aligned with the lower surfaces of wheels 107 and 108. When cart 62 is located above cart 61, bar 121 engages stops 125 and 126 on the rear or distal end of cart 61 to prevent cart 62 from over riding or running over cart 61.

As shown in FIGS. 17, 19 and 21, a pair of ears or stops 122 and 123 are secured to side members 102 and 103. Ears 122 and 123 engage downwardly directed members 210 and 215 on cart 63 when the carts are in a loaded relationship. The members 210 and 215 contact ears 122 and 123 to prevent cart 63 from over running off the back side of lower carts 61 and 62.

Figure 26:
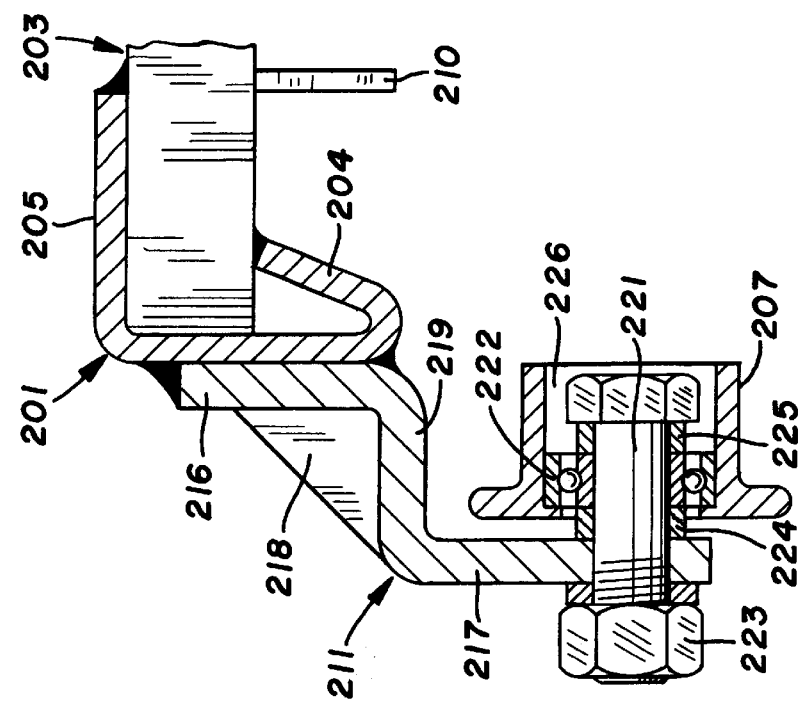
FIG. 26 is an enlarged sectional view taken along line 26—26 of FIG. 22.

The third cart 63, shown in FIGS. 22 to 26, has a pair of elongated side members or beams 201 and 202 secured to opposite sides of a deck 203. Deck 203 has a plurality of side-by-side transverse panels which could cover substantially all the space between members 201 and 202. The width of cart 63 is greater than the width of cart 62 to allow cart 63 to move over cart 62 to a stacked position, as shown in FIGS. 32 and 33. Each panel of deck 203 has the same structure as panel 69 shown in FIG. 15. As shown in FIG. 26, the side edge of deck 203 is located between flanges 204 and 205 of side member 201. Flange 204 extends inwardly and upwardly and is secured with welds to the ribs, corrugations or reinforcing structures of the panels of deck 203. The bottom flanges of side members 201 and 202 support deck 203 on members 201 and 202.

Cart 63 has wheels 207, 208, 209 and 210 that ride on the upper walls of rails 42 and 43. Brackets 211 and 214 secured to opposite ends of side member 201 mount wheels 207 and 210 below side member 201. A pair of brackets 212 and 213 secured to opposite ends of side member 202 support wheels 208 and 209. As shown in FIG. 26, bracket 211 is a stepped plate having an upright portion 216 secured to side member 201 and downwardly extended portion 217 offset outwardly. A gusset 218 secured to upright portion 216 and horizontal portion 219 reinforces bracket 211. Brackets 212, 213, and 214 have the same structure as bracket 211.

Wheel 207 is rotatably mounted on a bolt or axle 221 with a bearing 222. Bolt 221 extended through a hole in bracket portion 217 accommodates a nut 223 that retains bolt 221 on bracket portion 217. A first sleeve 224 spaces wheel 207 bracket 211. A second sleeve 225 spaces the head of bolt 221 from bearing 222. Bolt 221 clamps bearing 222 between sleeves 224 and 225 and fixes the lateral position of wheel 207 relative to bracket 211. The head end of bolt 221 and bearing 222 are located in a cavity 226 in wheel 207. Wheels 208, 209, and 210 are mounted on brackets 212, 213, and 214 with bolts and bearings according to the bolt and bearings structure shown in FIG. 26. Brackets 211–214 elevate cart 63 above cart 62.

Figure 24:
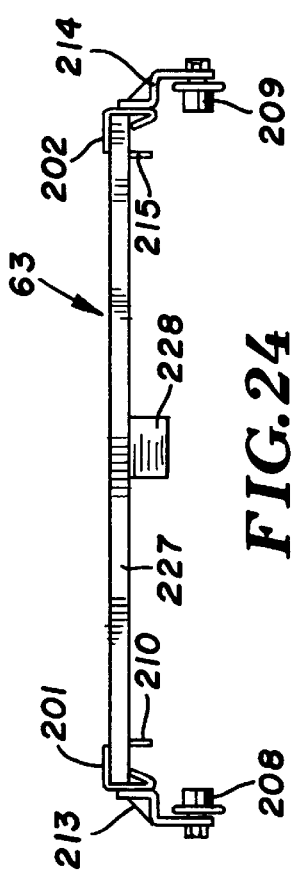
FIG. 24 is an end elevational view of the left end of FIG. 22 viewing along line 24—24 of FIG. 22.
Figure 25:
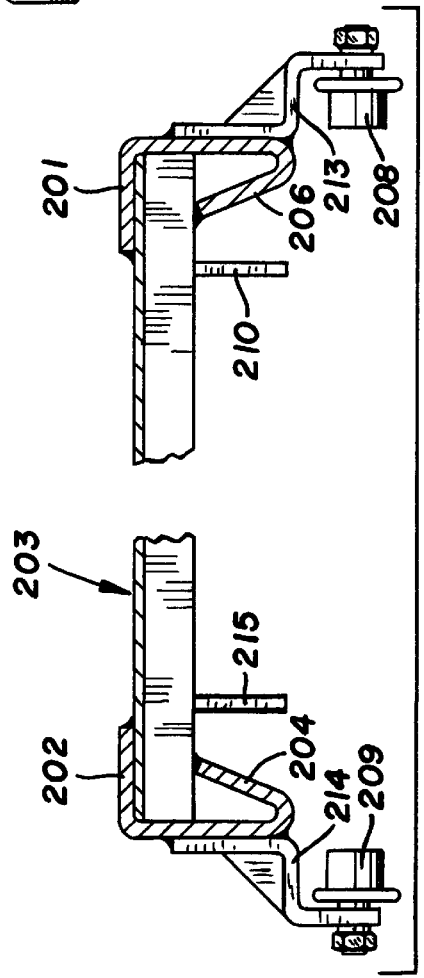
FIG. 25 is an enlarged foreshortened sectional view taken along line 25—25 of FIG. 22.

As seen in FIG. 22 and 24, a cross bar 227 extends between the rear ends of side members 201 and 202. Opposite ends of cross bar 227 are secured with welds to side members 201 and 202. A downward directed stop plate or finger 228 secured to the rear end of deck 203 engages last panel 67 of cart 62 when the carts are stacked. Plate 228 prevents cart 63 from running off the front of cart 62.

The fourth cart 64, shown in FIGS. 27 to 31, has a pair of elongated side members or beams 301 and 302 secured to opposite side of a deck 303. Deck 303 has a plurality of side-by-side transverse panels which could cover substantially all the space between members 301 and 302. The width of cart 64 is greater than the width of cart 63 to allow cart 64 to move over cart 63 to a stacked position, as shown in FIGS. 32 and 33. Each panel of deck 303 has the same structure as panel 69 shown in FIG. 15. As shown in FIG. 31, the side edge of deck 303 is located between flanges 304 and 305 of side member 301. Flange 304 extends upwardly and is secured with welds to the ribs, corrugations or reinforcing panels of the panels of deck 303. The opposite side edge of deck 303 is secured to side member 302 as shown in FIG. 30.

Cart 64 has wheels 307, 308, 309 and 310 that ride on the upper walls of rails 42 and 43. Brackets 311 and 314 secured to opposite ends of side member 301 mount wheels 307 and 310 below side member 301. A pair of brackets 312 and 313 secured to opposite ends of side member 302 support wheels 308 and 309. As shown in FIG. 31, bracket 314 is a plate having an upright portion 316 secured to side member 302 and a downwardly extended channel portion 317 offset outwardly. A gusset 326 secured to upright portion 316 reinforces bracket 314. Bracket 313 has the same structure as bracket 314. Brackets 311 & 312 do not have gusset 326. Brackets 311–314 elevate cart 64 above cart 63.

Wheel 307 is rotatably mounted on a bolt or axle 318 with a bearing 319. Bolt 318 extended through a hole in bracket portion 316 accommodates a nut 321 that retains bolt 318 on bracket portion 316. A first sleeve 322 surrounding bolt 318 spaces wheel 307 from bracket portion 316. A second sleeve 323 spaces the head of bolt 318 from bearing 319. The bolt 318 clamps bearing 319 between sleeves 322 and 323 and fixes the lateral position of wheel 307 relative to bracket portion 316. The head end of bolt 318 and bearing 319 are located in a cavity 324 in wheel 307. Wheels 308, 309, and 310 are mounted on brackets 311, 312 and 313 with bolts and bearings according to the bolt and bearings structure shown in FIG. 31.

As seen in FIGS. 27 and 29, a cross bar 325 extends between the rear ends of brackets 311 and 312. Opposite ends of cross bar 325 are secured with welds to bracket 311 and 312. Brackets 311 and 312 are secured to side members 301 and 302 which engage brackets 211 and 212 of cart 63 when located in the stacked position shown in FIGS. 32 and 33.

A pallet stop plate 327 extended across the rear or distal end of deck 303 is secured to side members 301 and 302. As seen in FIG. 32 a pallet 328 located on cart 64 engages plate 327 to position pallet 328 on cart 64.

Carts 61–64 have low profile decks secured to longitudinal side members. The decks can be continuous platforms that extend between the side members within the spaces between the side members. Most of the area between the side members is covered with the decks. The opposite side edge portions of the decks are secured to the side members. The combined side members and decks provide carts 61–64 with stability and strength without increasing the profile of the carts. The side members 101, 102, 201, 202 and 301, 302 of carts have upwardly direct lower flanges that engage and support the decks. The flanges are secured with welds to the decks.

In use, track assembly 41 is mounted on rack supports of a conventional rack or frame structure used in a warehouse. Track assembly 41 is inclined upwardly and rearwardly so that the carts and pallets must be pushed back along the rails during loading of the pallets on the carts. An empty pushback cart storage assembly 40 has 61–64 resting in stacked or nested positions, as shown in FIGS. 32 and 33. When a first pallet carrying a load is to be loaded on a cart the transfer vehicle, such as a fork lift, places the pallet on the deck of cart 64. A second pallet carrying a load is used to pushback cart 64 and pallet thereon and then place the second pallet on cart 63. A third pallet carrying a load is used to pushback the first and second carts 64 and 63 and then place the third pallet on cart 62. A fourth pallet carrying a load is used to pushback the first, second and third carts 64, 63, 62 and then place the fourth pallet on cart 61. A fifth pallet carrying a load is finally used to pushback carts 61–64 so that the fifth pallet can be carrying a load deposited on track assembly 41 adjacent bar 46.

When the stored pallets are retrieved the fork lift is used to remove the pallets from track assembly 41 and carts 61–64. The foremost pallet is first removed from track assembly 41. The remaining pallets roll forward on their respective carts to the unloading position. The pallets are sequentially removed from carts 61–64 with the fork lift.

The pushback cart storage apparatus has been described to accommodate five pallets carrying loads. The length of the track assembly and number of carts can vary. The pushback cart storage apparatus can have multiple carts. Additional variations and changes in the track assembly and carts may be employed by one skilled in the art without departing from the invention, which is defined in the claims.

What is claimed is:

1. An apparatus for storing pallets used to carry loads comprising: a track assembly having a pair of parallel linear rails, a plurality of carts for carrying pallets movably mounted on the rails, each of said rails having a step box cross section, a bottom wall, upright first and second side walls joined to the bottom wall, upright middle wall located between said upright side walls, an upper top wall joined to the first side wall and middle wall, and a lower top wall joined to the second side wall and middle wall to locate the lower top wall below the horizontal plane of the upper top wall; each of said carts having a pair of parallel laterally spaced side members, each of said side members having an inwardly directed longitudinal top flange and an inwardly and upwardly directed longitudinal lower flange spaced below the top flange, deck means extended between and secured to the side members for accommodating a pallet, said deck means covering generally all of the area between the side members, said deck means having first and second ends, said first end of the deck means being located in the space between the top flange and lower flange of one side member, said second end of the deck means being located in the space between the top flange and lower flange of the other side member, means securing the first and second ends of the deck means to the top and lower flanges of the side members, and wheel means mounted on the side members supporting the carts on the rails, said wheel means of some of the carts being engagable with lower top walls of the rails and said wheel means of other carts being engagable with the upper top walls of the rails whereby the plurality of carts can be located in vertical stacked relation and moved in generally end-to-end relation along the length of the rails.

2. The apparatus of claim 1 wherein: the lower top wall slopes downwardly and inwardly from the second side wall to the middle wall.

3. The apparatus of claim 1 wherein: the carts comprise first and second carts having wheels engageable with the lower top walls of the rails, and third and fourth carts having wheels engageable with the upper top walls whereby the third and fourth carts are located at elevations above the first and second carts.

4. The apparatus of claim 3 wherein: the lower top wall of each rail slopes downwardly and inwardly at an angle of about 5 degrees relative to a horizontal plane of the rail from the second side wall to the middle wall.

5. The apparatus of claim 1 wherein: the deck means comprises a plurality of side-by-side panels.

6. The apparatus of claim 5 wherein: each panel has a top wall, and transverse reinforcing means included in the top wall.

7. The apparatus of claim 6 wherein: each panel has transverse side edges, and transverse flanges joined to the side edges of the panel.

8. The apparatus of claim 5 wherein: each panel has a top wall and linear transverse side edges, said top wall having a pair of downwardly directed U-shaped portions located generally parallel to the side edges of the panel, and linear transverse flanges joined to the side edges of the panel.

9. The apparatus of claim 5 wherein: each side member has a longitudinal vertical wall joined to the top flange and lower flange, each of said panels having a first end located between the top flange and lower flange of one side member and engagable with the vertical wall of the one side member, and a second end opposite the first end located between the top flange and lower flange of the other side member and engagable with the vertical wall of the other side member.

10. The apparatus of claim 1 wherein: each side member has a longitudinal vertical wall joined to the top flange and lower flange, said first and second ends of the deck means being engagable with a vertical wall of a side member.

11. The apparatus of claim 1 wherein: the deck means comprises a sheet metal panel.

12. An apparatus for storing pallets used to carry loads comprising: a track assembly having a pair of parallel linear rails, at least two carts having wheels engagable with the rails to movably support the carts on the rail, each of said rails is a step box beam having upright side walls, an upright middle wall located between the side walls, said middle wall having an upper edge and a lower edge, an upper top wall joined to one side wall and the upper edge of the middle wall, and a lower top wall joined to the other side wall and the lower edge of the middle wall, whereby the lower top wall is below the horizontal plane of the upper top wall, said wheels of one cart engagable with the upper top wall and the wheels of the other cart engagable with the lower top wall whereby one cart rides on the upper top wall and the other cart rides on the lower top wall.

13. The apparatus of claim 12 wherein: the lower top wall of each rail slopes downwardly and inwardly from the other side wall to the lower edge of the middle wall.

14. The apparatus of claim 12 wherein: the lower top wall of each rail slopes downwardly and inwardly at an angle of about 5 degrees relative to a horizontal plane of the rail from the other side wall to the middle wall.

15. The apparatus of claim 12 wherein: first and second carts have wheels engageable with the lower top walls of the rails and a third cart having wheels engageable with the upper top walls of the rails.

16. The apparatus of claim 12 wherein: first and second carts have wheels engageable with the lower top walls of the rails, and third and fourth carts having wheels engageable with the upper top walls of the rails.

17. An apparatus for storing pallets used to carry loads comprising: a track assembly having a pair of parallel linear rails, at least one cart for carrying a pallet movably mounted on the rails, said cart having a pair of parallel laterally spaced side members, each of said side members having a longitudinal vertical wall and a longitudinal inwardly directed top flange joined to the vertical wall deck means extended between and secured to the side members for accommodating a pallet, said deck means having a thickness less than the height of the vertical walls of the side members, a top wall, and first and second ends, said top wall having downwardly directed transverse portions for reinforcing said top wall, said first end of the deck means being located under a top flange and engagable with a vertical wall of one side member, said second end of the deck means being located under the top flange and engagable with the vertical wall of the other side member, means securing the top walls of the deck means to said top flanges of the side members, and wheel means mounted on the side members engagable with the rails whereby the cart is movably supported on the rails.

18. The apparatus of claim 17 wherein: the deck means comprises at least one sheet metal panel.

19. The apparatus of claim 17 wherein: the deck means comprise a plurality of side-by-side panels.

20. The apparatus of claim 19 wherein: each panel has a top wall, and at least one transverse reinforcing means.

21. The apparatus of claim 20 wherein: each panel has transverse side edges, and transverse flanges joined to the side edges of the panel.

22. The apparatus of claim 19 wherein: each panel has a top wall and linear transverse side edges, said top wall having a pair of downwardly directed U-shaped portions located generally parallel to the side edges of the panel, and linear transverse flanges joined to the side edges of the panel.

23. The apparatus of claim 22 wherein: each side member has an upwardly directed flange engageable with and secured to each panel.

24. The apparatus of claim 19 wherein: the panels have opposite side portions, each side member has an upper longitudinal flange extended over and secured to a side portion of each panel and an upwardly directed lower longitudinal flange engageable with and secured to the panels whereby the side portions of the panels are located between and secured to the upper and lower flanges of the side members.

25. The apparatus of claim 17 wherein: each side member has an upwardly directed flange engageable with and secured to the deck means.

26. A cart for an apparatus having a track assembly movably supporting the cart, said cart adapted to support a pallet used to support a load comprising: a pair of parallel laterally spaced side members, each of said side members having an inwardly directed longitudinal top flange and an inwardly and upwardly directed longitudinal lower flange spaced below the top flange, deck means extended between and secured to the side members for accommodating a pallet, said deck means covering substantially all of the area between the side members, said deck means having first and second ends, said first end of the deck means being located in the space between the top flange and lower flange of one side member, said second end of the deck means being located in the space between the top flange and lower flange of the other side member, means securing the first and second ends of the deck means to the top and lower flanges of the side members, and wheel means mounted on the side members adapted to ride on the track assembly to movably support the cart on the track assembly.

27. The cart of claim 26 wherein: the deck means comprise a plurality of side-by-side panels.

28. The cart of claim 27 wherein: each panel has a top wall extended between the side members.

29. The cart of claim 27 wherein: each panel has transverse side edges, and transverse flanges joined to the side edges of the panel.

30. The cart of claim 27 wherein: each panel has a top wall and linear transverse side edges, said top wall having a pair of downwardly directed U-shaped portions located generally parallel to the side edges of the panel, and linear transverse flanges joined to the side edges of the panel.

31. The cart of claim 27 wherein: each side member has an upwardly directed flange engageable with and secured to each panel.

32. A cart for an apparatus having a track assembly movably supporting the cart comprising:

a pair of parallel laterally spaced side members, each of said side members having longitudinal generally vertical walls and an inwardly directed longitudinal top flange joined to said wall, deck means for supporting a load, said deck means having a thickness less than the height of the vertical walls of the side members, a top wall, and first and second ends, said top wall having downwardly directed transverse portions for reinforcing said top wall, said first end of the deck means being located under the top flange and engagable with a vertical wall of one side member, said second end of the deck means being located under the top flange and engagable with the vertical wall of the other side member, means securing the top wall of the deck means to said top flanges of the side members, and wheel means mounted on the side members adapted to ride on a track assembly to movably support the cart on the track assembly.

33. The cart of claim 32 wherein: each side member includes an inwardly and upwardly directed lower flange joined to said vertical wall and spaced below the top flange, said first end of the deck means being located in the space between the top and lower flanges of the one side member, said second end of the deck member being located in the space between the top and lower flanges of the other side member, and means securing the first and second ends of the deck means to the lower flanges of the side members.

34. The cart of claim 32 wherein: the deck means comprises a plurality of side-by-side panels, each panel has transverse side edges, said downwardly directed transverse portions being located between said side edges.

35. The cart of claim 34 wherein: each panel of the deck means comprises a sheet metal panel.

36. The cart of claim 32 wherein: the downwardly directed transverse portions comprise a pair of parallel downwardly directed U-shaped portions.

* * * * *